(12) United States Patent
Hori

(10) Patent No.: US 6,985,418 B2
(45) Date of Patent: Jan. 10, 2006

(54) OPTICAL DISK REPRODUCING APPARATUS

(75) Inventor: Masayuki Hori, Fukushima (JP)

(73) Assignee: Denon, Ltd., Tokyo (JP)

( * ) Notice: Subject to any disclaimer, the term of this patent is extended or adjusted under 35 U.S.C. 154(b) by 261 days.

(21) Appl. No.: 10/395,089

(22) Filed: Mar. 25, 2003

(65) Prior Publication Data

US 2003/0223334 A1 Dec. 4, 2003

(30) Foreign Application Priority Data

May 28, 2002 (JP) ........................ 2002-153514

(51) Int. Cl.
*G11B 7/00* (2006.01)

(52) U.S. Cl. .................. 369/47.38; 369/47.43; 369/53.3

(58) Field of Classification Search ............ 369/47.38, 369/47.43, 53.3, 47.32, 47.4, 47.41
See application file for complete search history.

(56) References Cited

U.S. PATENT DOCUMENTS 5,956,307 A * 9/1999 Koudo et al. ............ 369/47.43

6,434,100 B1 8/2002 Usui
2001/0017821 A1 8/2001 Inoue et al.

FOREIGN PATENT DOCUMENTS

JP 2000-182318 6/2000
JP 2001-312857 11/2001

* cited by examiner

*Primary Examiner*—Nabil Hindi
(74) *Attorney, Agent, or Firm*—Dickstein Shapiro Morin & Oshinsky LLP

(57) ABSTRACT

The present invention provides an optical disk reproducing apparatus capable of providing special reproducing (replay) mode using a jog dial in a manner similar to the special reproduction using an analog record player such as scratching etc. When the operation disk is rotating at a same predetermined speed as the rotation speed of the disk, the normal reproducing (replay) is performed. The special reproducing (replay) such as scratching is performed when the operation disk is turned, and the turning speed and direction of the operation disk are detected. Since the disk keeps rotating at the predetermined speed, the operation disk restart the rotation at the predetermined speed immediately after the operation of the operation disk is terminated so as to resume the normal reproducing (replay)

1 Claim, 3 Drawing Sheets

OPTICAL DISK REPRODUCING APPARATUS

BACKGROUND OF THE INVENTION

The present invention relates to optical disk reproducing apparatus capable of storing audio data reproduced from an optical disk into a memory and varying the readout speed and readout sequence of the audio data stored in the memory.

The operators called DJ (disc jockeys), who reproduce audio data by operating audio reproducing apparatus, perform special effect reproducing called scratching, which produces a sound effect such as scratch sound while they reproduce audio signal recorded on analog records or optical disks such as CD (compact disc). When a DJ performs the scratching by using an analog record player, he/she produces the scratch sounds by turning the analog record quickly in the forward or backward direction. Furthermore, there are CD players designed for DJ available, to operate the special sound reproduction similar to the scratching of analog records. A CD player of this type comprises a jog dial and a memory, stores audio data reproduced from a CD into the memory, and controls the readout speed and readout sequence of the audio data stored in the memory, so as to produce sound effects that are similar to the scratch sound from analog record by turning the jog dial into the forward or backward direction quickly. In this way, the DJ can produce the special sound effects such as scratching similar to that are produced on an analogue record player by turning the jog dial in the same manner as with an analog record player while reproducing the audio data recorded on a CD.

The CD player designed for DJ described above reproduces the audio data recorded on the CD in a normal speed (hereinafter referred to as "normal reproducing (replay)") when the jog dial is not operated. When the jog dial is operated, the CD player detects the turning speed and direction of the jog dial, and performs special reproducing (replay) in which the readout speed and readout sequence of the audio data reproduced from the CD and stored in the memory are changed according to the detected turning speed and direction.

SUMMARY OF THE INVENTION

When a DJ turns the jog dial of a conventional CD player, and then release his/her hand from the jog dial, the jog dial may not stop right away due to inertial force. Particularly, because the DJ quickly turns the jog dial in the forward or backward direction in the scratching operation, the jog dial will not stop right away after the DJ releases his/her hand from the jog dial, and the jog dial will take some time to stop its rotation, so that the DJ cannot switch back to the normal reproducing (replay) mode at his/her intended timing. Therefore, there has been a problem that the sound effects similar to that obtained from the scratching operation of an analog record player cannot be obtained from a CD player with a jog dial even by the turning operation of the jog dial.

Furthermore, some CD players having a jog dial and a memory comprises a function to cancel the operation on the jog dial, for example, by pressing the reproducing (replay) button. When using such a CD player, a DJ may switch back from the special reproducing (replay) mode to the normal reproducing (replay) mode at an intended timing by pressing the reproducing (replay) button right after the completion of the turning operation of the jog dial since the pressing the reproducing (replay) button can cancel the prior turning operation of the jog dial. However, since the operation manner of the special reproducing (replay) mode using this function is different from that in the operation of an analogue record player, there has been a problem that DJs had to face the unaccustomed way of operation.

The present invention was made to resolve the above problem, and its object is to provide optical disk reproducing apparatus which is capable of providing special reproduction (replay) mode when reproducing an optical disk such as CD through a operation similar to that in the special reproducing (replay) mode of analogue record player.

In order to resolve the above problem, the optical disk reproducing apparatus of the present invention comprises a reproduction means which reproduces audio data recorded on an optical disk, a storing means which stores the audio data reproduced by the reproduction means, and a readout instruction means which instructs the readout speed and the readout sequence of the audio data stored in the storing means, wherein the readout instruction means comprises a operation disk, a disk on which the operation disk is mounted, a driver which rotationally drives the disk, first detection means which detects the rotation speed and rotation direction of the operation disk, second detection means which detects the rotation speed of the disk, and a controller which controls the readout speed and readout sequence of the audio data stored in the storing means based on the rotation speed and rotation direction of the operation disk detected by the first detection means and also controls the driver so that the rotation speed of the disk detected by the second detection means is kept constant.

DETAILED DESCRIPTION OF THE PREFERRED EMBODIMENTS

An embodiment of the present invention will be explained below according to the attached drawings.

Figure 1:
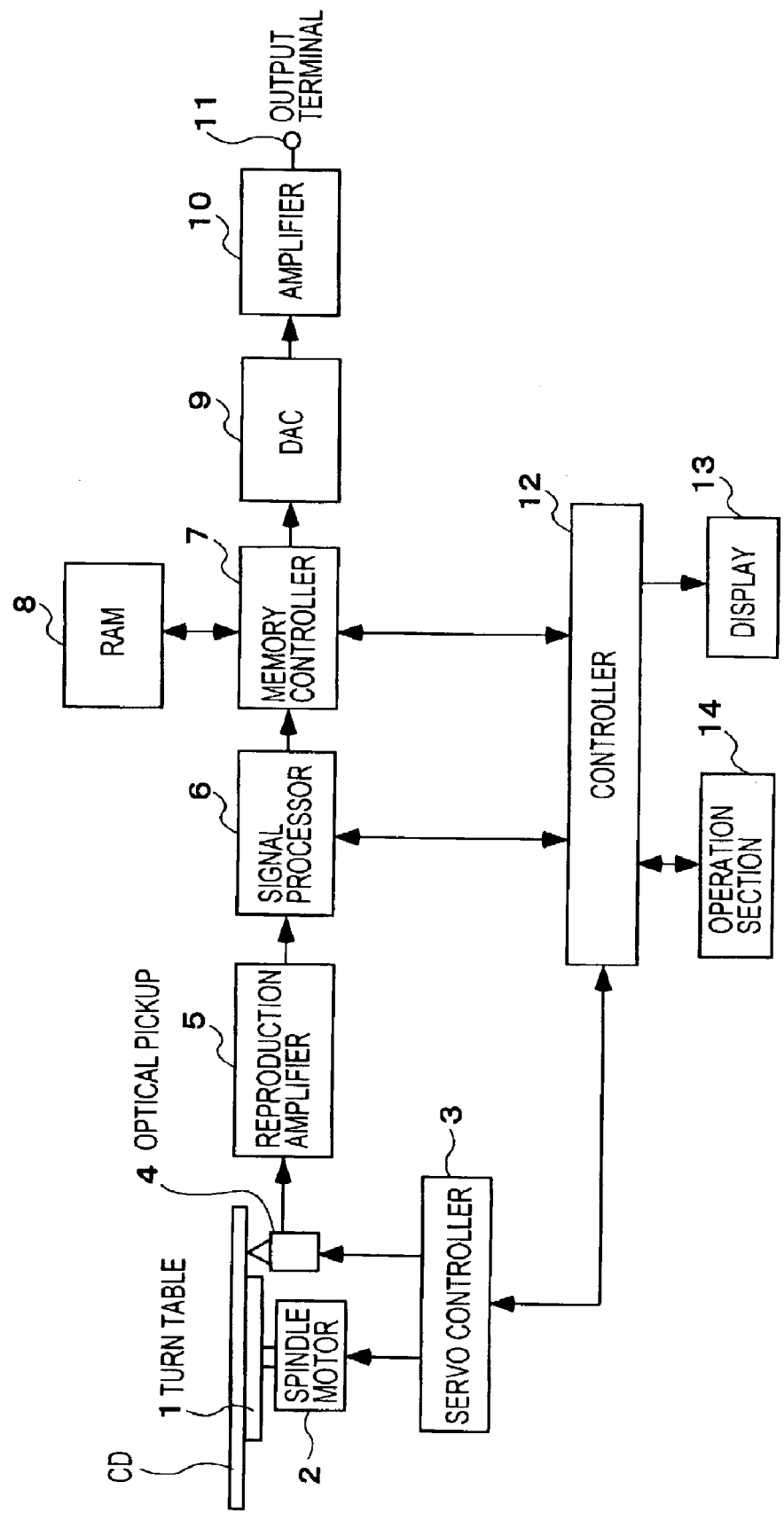
FIG. 1 is a block diagram showing the configuration of a CD player according to the embodiment of the present invention.

FIG. 1 is a block diagram illustrating the schematic configuration of a CD player according to one embodiment of the present invention. FIG. 1 shows a turn table 1, spindle motor 2, a servo controller 3, an optical pickup 4, a reproduction amplifier 5, a signal processor 6, a memory controller 7, RAM (a random access memory) 8, DAC (a digital-analog converter) 9, an amplifier 10, an output terminal 11, a controller 12, a display 13, and an operation section 14. The optical disk reproducing apparatus according to one embodiment of the present invention comprises a jog dial as a readout instruction section in the operation section 14, and is a CD player for DJ capable of varying the readout speed and readout sequence of the digital audio data, which has been reproduced from the CD and stored within the RAM 8, according to the turning speed and turning direction of the jog dial.

The turn table 1 fixed to the spindle motor 2 fixes a CD. When a reproduction-start instruction is inputted through the operation section 14, the servo controller 3 starts to control the drive of the spindle motor 2 to rotate at a specified linear speed. The servo controller 3 also controls a focus servo circuit and a tracking servo circuit (not shown) in order to properly trace the pits of the CD with a laser beam from the optical pickup 4.

The digital audio data reproduced by the optical pickup 4 is wave-formed and amplified by the reproduction amplifier 5 and then inputted into the signal processor 6. The signal processor 6 demodulates the digital audio data, and takes out synchronization signals and error signals such as focus error signals and tracking error signals, and inputs the digital audio data into the memory controller 7.

The memory controller 7 controls the inputted digital audio data, so as to input the data into the RAM 8. The RAM 8 stores the inputted digital audio data. The digital audio data stored within the RAM 8 is read out from the RAM 8 and inputted into DAC 9 under the control of the memory controller 7.

DAC 9 converts the digital audio data into an analog audio signal and input it to the amplifier 10. The analog audio signal inputted from the DAC 9 is amplified by the amplifier 10 and outputted from a speaker etc. connected to the output terminal 11.

The display 13 displays the reproducing (replay) time and track number etc. of the track currently being reproduced. The operation section 14 comprises a jog dial, a reproducing (replay) button, a stop-reproducing (a stop-replay) button and an eject button etc.

Figure 2:
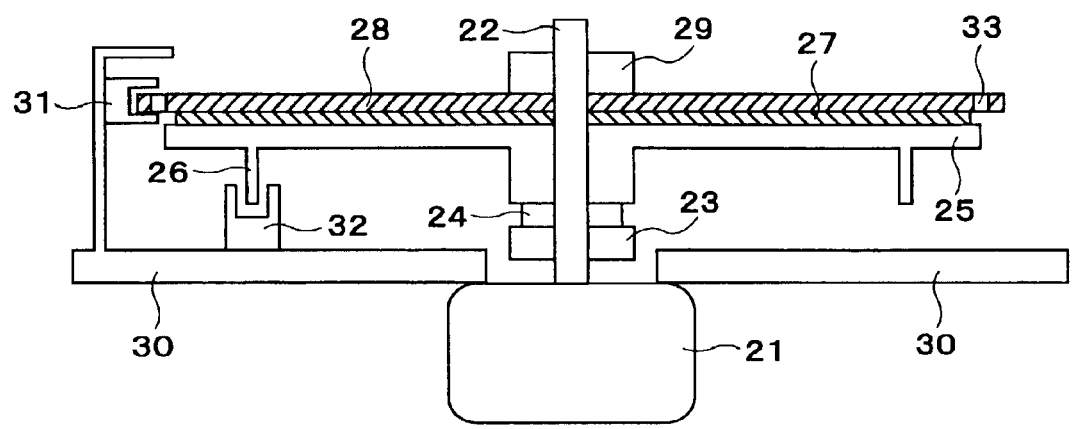
FIG. 2 is a cross-sectional view of a jog dial section included in the operation section of a CD player according to the embodiment of the present invention.

FIG. 2 is a cross-sectional view of the jog dial provided in the operation section 14 of the CD player according to the embodiment of the present invention. FIG. 2 shows a motor 21, a rotation axis 22, a fixed support 23, a support 24, a disk 25, a slit section 26, a sheet 27, an operation disk 28, a stopper 29, a panel 30, a first optical sensor section 31, a second optical sensor section 32, and slit section 33.

The configuration of the jog dial as shown in FIG. 2 will now be explained.

The jog dial is provided on the top surface of the panel 30 of the CD player of the present embodiment. The fixed support 23 is fixed to the rotation axis 22 of the motor 21 fixed on the bottom surface of the panel 30. The support 24 is mounted on the top surface of the fixed support 23. This support 24 is a member having a large coefficient of friction, and is such as a resilient member made of rubber. The disk 25 is mounted on the top surface of the support 24. On the back side of this disk 25, a slit section 26 is provided. The slit section 26 is, for example, made of the same material as the disk 25, and is a ring-shaped plate with rectangular openings at equal intervals. The sheet 27 is mounted over the top surface of the disk 25. This sheet 27 is made of a resin material having a small coefficient of friction and resisting to produce static electricity. The operation disk 28 is mounted on the top surface of the sheet 27. On the periphery of this operation disk 28, a slit section 33 having rectangular openings at equal intervals are provided. The stopper 29 is fixed to the rotation axis 22 in order to prevent the support 24, disk 25, sheet 27 and operation disk 28 from slipping out from the rotation axis 22.

Now, a material to be used as the sheet 27, for example, shall have a coefficient of friction that allows the operation disk 28 in a static state to follow the rotation speed of the disk 25 after 0.1 to 0.2 seconds.

Furthermore, the weight and moment of inertia of the operation disk 28 shall be made small by expanding its area and adjusting its material and thickness to allow the operation disk 28 to follow the driving torque transmitted from the motor 21 so as to restart the rotation at the predetermined speed when the hand is released from the operation disk 28 even though the sheet 27 has a small coefficient of friction.

The first optical sensor section 31 is provided two optical sensors to detect the rotation speed and rotation direction of the operation disk 28, and is fixed to the panel 30 to detect of the openings of the slit section 33. In the similar manner, the second optical sensor section 32 comprises an optical sensor to detect the rotation speed of the disk 25, and is fixed to the panel 30 to detect the openings of the slit section 26.

The first optical sensor section 31 detects the openings of the slit section 33 of the operation disk 28, generates a first pulse signal based on the rotation state (rotation speed and rotation direction) of the operation disk 28, and inputs the first pulse signal to the controller 12. Also, the second optical sensor section 32 detects the openings of the slit section 26 of the disk 25, generates a second pulse signal based on the rotation state of the disk 25, and inputs the second pulse signal to the controller 12.

The controller 12 determines the readout speed and readout direction of the digital audio data stored in the RAM 8 based on the first pulse signal inputted from the first optical sensor section 31, and controls the memory controller 7. The controller 12 also controls the motor 21 so that it keeps the rotation speed of the disk 25 to a predetermined speed based on the second pulse signal inputted from the second optical sensor section 32.

In the CD player of the present embodiment, the above-mentioned predetermined speed is set, for example, as the speed of the turn table in the case of reproducing an analog record player, and the rotation direction is set clockwise as the rotation direction of the turn table of the analog record player.

Here, since the support 24, disk 25, sheet 27 and operation disk 28 rotate at the same speed and in the same direction with motor 21, the operation disk 28 would provide the motions similar to that of an analog record when the audio data recorded on a CD is reproduced by the CD player of the present embodiment.

During normal operation, when a operator places his/her hand etc. on the operation disk 28, the disk 25 keeps rotating at a predetermined speed without being affected by the motion of the operation disk 28 since the sheet 27 has a small coefficient of friction. However, when the force applied to the operation disk 28 increases, the friction force will increase accordingly, and the disk will start being affected by the motion on the operation disk 28. In this case also, the rotation speed of the disk 25 will be kept constant due to the feedback control of the controller 12.

The detection method of the rotational state of the optical sensor sections will now be explained.

Figure 3:
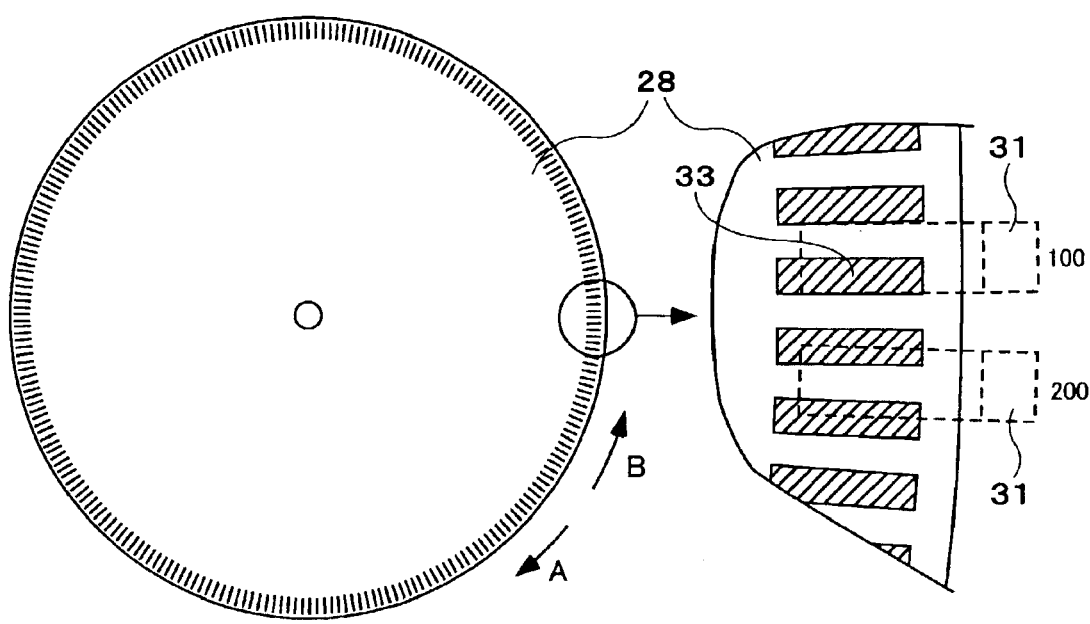
FIG. 3 is a diagram showing the relative positions between slit section 33 on the operation disk 28 and a first optical sensor section 31.
Figure 4:
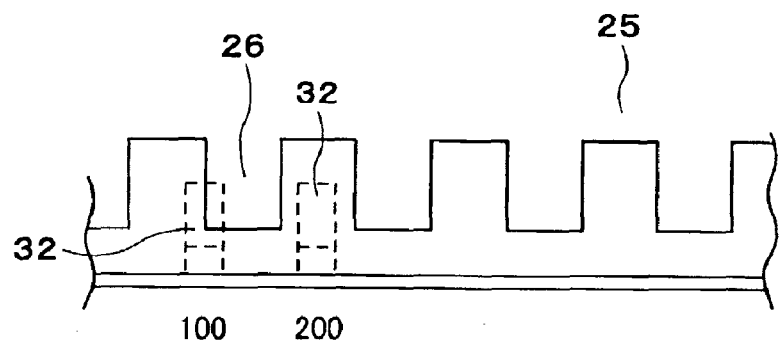
FIG. 4 is a diagram showing the relative positions between slit section 26 on the disk 25 and a second optical sensor section 32.

The relative positions between the slit section 33 of the operation disk 28 and the first optical sensor section 31 is shown in FIG. 3, and the relative positions between the slit section 26 of the disk 25 and the second optical sensor section 32 is shown in FIG. 4. FIG. 4 shows an embodiment, wherein the second optical sensor section 32 comprises two optical sensors, although the second optical sensor section 32 may only have one optical sensor.

Figure 5:
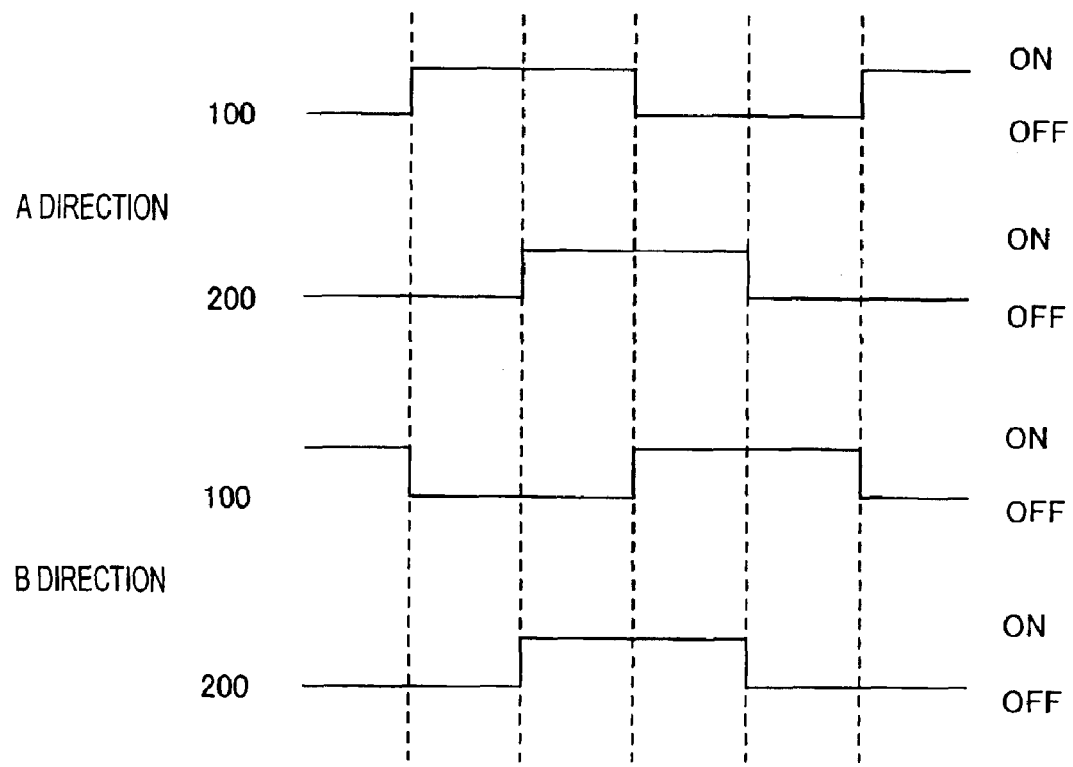
FIG. 5 is an illustrative diagram that explains the relationship between the turning direction of the operation disk 28 and outputs of a first pulse signal from the optical sensor.

FIG. 5 is an illustrative drawing to explain the relationship between the turning direction of the operation disk 28 and the first pulse signal output from the optical sensor.

In the explanation below, the operation disk 28 is used as an example.

The two optical sensors of the first optical sensor section 31 are numbered 100 and 200, respectively. The optical sensors 100 and 200 output pulse signals indicating OFF when detecting the opening of the slit section 33, and output pulse signals indicating ON when detecting the opening of the slit section 33 is closed by the operation disk 28.

The optical sensors 100 and 200 are disposed so as to generate the following 4 patterns as the combinations of the pulse signals they output.
1: 100ON–200ON
2: 100ON–200OFF
3: 100OFF–200ON
4: 100OFF–200OFF Here, the rotation speed is calculated by the controller 12 based on the number of pulses outputted during a given period of time. The rotation direction is determined by the controller 12 based on the generation sequence of the output patterns of the pulse signals from the optical sensors 100 and 200 that would vary depending on the rotation direction of the operation disk 28.

Specifically, when the operation disk 28 is turned in the direction indicated by the arrow A in FIG. 3, the output patterns are generated in a sequence #4→#2→#1→#3→#4→#2. . . as shown in FIG. 5.

On the other hand, when the operation disk 28 is turned in the direction indicated by the arrow B, the output patterns are generated in a sequence #2→#4→#3→#1→#2→>4. . . as shown in FIG. 5.

The controller 12 detects the generated sequence of the output pattern to determine the rotation direction.

The reproduction behavior of the CD player according to one embodiment of the present invention when the operation disk 28 turning at a predetermined speed is stopped will be explained.

Fist, the DJ places his/her hand on the operation disk 28 rotating at a predetermined speed to gradually slow down its rotation speed. At this point, the disk 25 keeps rotating at a predetermined speed without being affected by the rotation speed and direction of the operation disk 28. When the rotation speed of the operation disk 28 changes, the number of the pulses generated from the first optical sensor section 31 during a set period of time will vary according to the rotation speed of the operation disk 28. The controller 12 determines the rotation speed of the operation disk 28 from the number of pulses of the first pulse signal inputted from the first optical sensor section 31 during the set period of time. The controller 12 then controls the memory controller 7 based on the determined rotation speed. The memory controller 7 controls to slow down the speed of the digital audio data that reads out from the RAM 8.

When the rotation of the operation disk 28 is stopped, the first optical sensor section 31 will not input the first pulse signal to the controller 12. The controller 12 will control the memory controller 7 to stop the readout of the digital audio data from RAM 8 when the first pulse signal from the first optical sensor section 31 is not inputted.

When the DJ releases his/her hand from the operation disk 28 to terminate the operation, the operation disk 28 will immediately restart the rotation at the predetermined speed since the disk 25 is rotating at the predetermined speed. When the operation disk 28 restarts the rotation at the predetermined speed, the controller 12 controls the memory controller 7 to readout the digital audio data from the RAM 8 at the readout speed of the normal reproducing (replay) mode.

In addition, when the DJ gradually accelerates the rotation speed by using his/her hand to turn the operation disk 28 faster than the predetermined speed, the controller 12 controls the memory controller 7 to accelerate the readout speed of the digital audio data from the RAM 8 based on the number of pulses of the first pulse signal inputted from the first optical sensor section 31 during the set period of time.

Next, the reproduction behavior of the CD player according to one embodiment of the present invention when the operation disk 28 is turned in the direction opposite to the direction of the rotation at the predetermined speed will be explained.

The DJ turns the operation disk 28 rotating at a predetermined speed in the counter clockwise direction using his/her hand. At this point, the disk 25 keeps rotating at a predetermined speed without being affected by the rotation speed and direction of the operation disk 28. The first optical sensor section 31 comprises two optical sensors, and when the rotation direction of the operation disk 28 changes, the output patterns of the pulse signals generated by these two optical sensors will change according to the rotation direction of the operation disk 28. The controller 12 determines the rotation direction of the operation disk 28 from the output patterns of the first pulse signals inputted from these two optical sensors. Furthermore, as explained above, the controller 12 determines the rotation speed of the operation disk 28 based on the number of pulses of the first pulse signal inputted from the first optical sensor section 31 during a set period of time. The controller 12 controls the memory controller 7 based on the determined rotation speed and rotation direction. The memory controller 7 controls the speed and sequence of the digital audio data read out from the RAM 8.

When the DJ releases his/her hand from the operation disk 28 to terminate the operation, the operation disk 28 immediately restarts the rotation at the predetermined rotation speed and in the predetermined rotation direction since the disk 25 is rotating at the predetermined speed. When the operation disk 28 restarts the rotation at the predetermined speed and in the predetermined direction, the controller 12 controls the memory controller 7 to read out the digital audio data from the RAM 8 at the readout speed of the normal reproducing (replay) mode.

In the embodiment above, while the operation disk 28 is operated, when the rotation speed of the disk 25 that rotates at the predetermined speed changes, the controller 12 controls the motor 21 based on the number of pulses of the second pulse signal inputted from the second optical sensor section 32 during the set period of time so as to keep the predetermined rotation speed of the disk 25.

When the scratching operation is performed using the CD player according to the embodiment of the present invention, the DJ repeats the operations of turning the operation disk 28 quickly in the forward or backward direction. The controller 12 determines the rotation speed and rotation direction of the operation disk 28 based on the first pulse signals inputted from the first optical sensor section 31. The controller 12 then controls the memory controller 7 based on the determined rotation speed and rotation direction. The memory controller 7 controls the readout speed and readout sequence (readout of the audio data either by the ascending or descending order of the addresses) of the digital audio data stored on the RAM 8. The digital audio data read out from the RAM 8 is converted into analog audio signal by the DAC 9, amplified by the amplifier 10, and then outputted as a sound such as a scratch sound from the speaker connected by output terminal 11.

The disk 25 and the operation disk 28 in the jog dial section of the operation section 14 of the CD player according to the embodiment of the present invention have a configuration that allows special reproduction of effect such as scratching through the turning operation of the operation disk 28 from the original state rotating at the same predetermined speed. Accordingly, after the operation of the operation disk 28, it can immediately restart the rotation at the predetermined speed and direction, so that switching between the special reproducing (replay) mode and normal reproducing (replay) mode can be easily performed.

Furthermore, since the controller 12 controls the motor 21 to keep the rotation speed of the disk 25 to a predetermined speed based on the number of pulses of the second pulse signal inputted from the second optical sensor section 32, the change of the rotation speed of the disk 25 due to the rotational operation of the operation disk 28 may be prevented. Accordingly, after the rotational operation of the operation disk 28 is terminated, the operation disk 28 may immediately resume the rotation at the predetermined speed.

Accordingly, the CD player of the present embodiment realizes the control that allows the DJ to resume the normal reproducing (replay) mode at his/her intended timing, and at the same time, it realizes the operability similar to the special reproducing (replay) mode of analog record.

In the present embodiment, the present invention has been explained as being a CD player, however, the present invention is applicable to wide variety of other types of optical disk reproducing apparatus.

According to the optical disk reproducing apparatus of the present invention, an optical disk reproducing apparatus is provided, which is capable of performing special reproducing (replay) with the operation similar to that of an analog record player since it is capable of restarting the normal reproducing (replay) mode immediately after the special reproducing (replay) mode using a jog dial.

What is claimed is:

1. An optical disk reproducing apparatus comprising a reproduction means which reproduces audio data stored on an optical disk, a storing means which stores the audio data reproduced by said reproduction means, and a readout instruction means which instructs a readout speed and a readout sequence of the audio data stored in said storing means, wherein said readout instruction means comprises;

an operation disk, a disk on which said operation disk is mounted, a driver which rotationally drives said disk, a first detection means which detects the rotation speed and rotation direction of said operation disk, a second detection means which detects the rotation speed of said disk, and a controller which controls the readout speed and readout sequence of the audio data stored in said storing means based on the rotation speed and rotation direction of said operation disk detected by said first detection means, and controls said driver so that the rotation speed of said disk detected by said second detection means is kept constant.

* * * * *